(12) United States Patent
Haimer

(10) Patent No.: US 9,815,122 B2
(45) Date of Patent: Nov. 14, 2017

(54) TOOL ARRANGEMENT

(71) Applicant: FRANZ HAIMER MASCHINENBAU KG, Igenhausen (DE)

(72) Inventor: Franz Haimer, Igenhausen (DE)

(73) Assignee: FRANZ HAIMER MASCHINENBAU KG, Igenhausen (DE)

(*) Notice: Subject to any disclaimer, the term of this patent is extended or adjusted under 35 U.S.C. 154(b) by 0 days.

(21) Appl. No.: 14/422,015

(22) PCT Filed: Aug. 13, 2013

(86) PCT No.: PCT/EP2013/066892
§ 371 (c)(1),
(2) Date: Feb. 17, 2015

(87) PCT Pub. No.: WO2014/026975
PCT Pub. Date: Feb. 20, 2014

(65) Prior Publication Data
US 2015/0217380 A1    Aug. 6, 2015

(30) Foreign Application Priority Data
Aug. 17, 2012    (DE) .......... 10 2012 107 546

(51) Int. Cl.
*B23B 31/11*    (2006.01)
*B23B 31/00*    (2006.01)
*B23C 5/10*    (2006.01)

(52) U.S. Cl.
CPC ........ *B23B 31/1115* (2013.01); *B23B 31/005* (2013.01); *B23C 5/1009* (2013.01);
(Continued)

(58) Field of Classification Search
CPC .............. B23B 31/1115; B23B 31/005; B23B 2231/0296; B23B 2270/06; B23B 31/11;
(Continued)

(56) References Cited

U.S. PATENT DOCUMENTS

| 964,353 A | * | 7/1910 | Whittier | ................ | F16L 13/126 |
| | | | | | 279/99 |
| 1,922,689 A | * | 8/1933 | Linnenbruegge | ....... | F16B 33/02 |
| | | | | | 411/307 |

(Continued)

FOREIGN PATENT DOCUMENTS

| CN | 101058122 | 10/2007 |
| DE | 870344 C | 3/1953 |

(Continued)

OTHER PUBLICATIONS

International Search Report for PCT/EP2013/066892 dated Nov. 29, 2013.

(Continued)

*Primary Examiner* — Eric A Gates
*Assistant Examiner* — Chwen-Wei Su
(74) *Attorney, Agent, or Firm* — Paul D. Bianco; Gary S. Winer; Fleit Gibbons Gutman Bongini & Bianco PL

(57) ABSTRACT

A tool arrangement with a screw-in tool and a tool receiver, the screw-in tool having a thread for engagement in a counter thread on the tool receiver. The counter thread and the thread have different thread contours and therefore, in the screwed condition, these adapt to one another by elastic deformation.

16 Claims, 2 Drawing Sheets

(52) U.S. Cl.
CPC ... *B23B 2231/0204* (2013.01); *B23B 2265/08* (2013.01); *B23B 2270/06* (2013.01); *B23C 2210/02* (2013.01); *B23C 2210/03* (2013.01); *B23C 2240/245* (2013.01); *B23C 2240/32* (2013.01); *B23D 2277/02* (2013.01); *B23D 2277/066* (2013.01); *Y10T 279/16* (2015.01); *Y10T 279/17931* (2015.01); *Y10T 407/1948* (2015.01)

(58) Field of Classification Search
CPC .............. B23B 31/1107; Y10T 279/16; Y10T 279/17931; F16B 33/0004; F16B 39/284; F16B 35/041
USPC ...................................... 411/366.1, 305, 307
See application file for complete search history.

(56) References Cited

U.S. PATENT DOCUMENTS

| | | | | |
|---|---|---|---|---|
| 2,079,692 | A | * | 5/1937 | Lapointe ............. B23B 31/1107 285/332.3 |
| 2,328,602 | A | | 9/1943 | Bechler |
| 2,669,468 | A | * | 2/1954 | Clerke .................. F16L 15/001 215/329 |
| 3,079,181 | A | * | 2/1963 | Van Der Wissel ... E21B 17/042 285/333 |
| 3,087,360 | A | * | 4/1963 | Garberding ............. B23B 31/08 407/47 |
| 4,192,533 | A | * | 3/1980 | Blose .................. E21B 17/0423 285/334 |
| 4,770,448 | A | * | 9/1988 | Strickland ............. E21B 17/042 285/333 |
| 4,854,794 | A | * | 8/1989 | Oertel ..................... F16B 39/30 411/307 |
| 5,114,286 | A | * | 5/1992 | Calkins .................. B23B 31/11 408/226 |
| 5,163,790 | A | * | 11/1992 | Vig ..................... B23B 31/1107 279/8 |
| 5,738,472 | A | * | 4/1998 | Roopnarine ........... F16B 39/30 411/309 |
| 7,153,071 | B2 | * | 12/2006 | Blomberg ............... B23B 31/11 279/8 |
| 7,341,409 | B2 | | 3/2008 | Jonsson et al. |
| 7,611,311 | B2 | | 11/2009 | Kakai et al. |
| 8,226,333 | B2 | | 7/2012 | Kakai et al. |
| 8,690,500 | B2 | * | 4/2014 | Spichtinger ........... B23B 29/046 279/8 |
| 2001/0041089 | A1 | * | 11/2001 | Hecht ..................... B23B 31/11 403/343 |
| 2005/0207868 | A1 | * | 9/2005 | Uno ........................ F16B 33/02 411/386 |
| 2006/0073744 | A1 | * | 4/2006 | Jonsson .................. B23B 31/11 439/884 |
| 2007/0248421 | A1 | | 10/2007 | Kakai |
| 2008/0304923 | A1 | * | 12/2008 | Lehto .................... B23B 31/005 407/100 |
| 2009/0123240 | A1 | * | 5/2009 | Borschert ........... B23B 31/1107 407/40 |
| 2010/0014928 | A1 | | 1/2010 | Kakai |
| 2010/0061820 | A1 | * | 3/2010 | Haimer ................... B23B 31/02 408/143 |
| 2013/0142582 | A1 | * | 6/2013 | Lee ........................ B23B 29/02 408/226 |

FOREIGN PATENT DOCUMENTS

| | | |
|---|---|---|
| DE | 3912503 A1 * | 3/1990 |
| DE | 102005012025 A1 | 12/2006 |
| EP | 0771934 A2 | 5/1997 |
| EP | 1847345 A2 | 10/2007 |
| FR | 2602162 A1 | 2/1988 |
| WO | 03068436 A1 | 8/2003 |

OTHER PUBLICATIONS

Result of Examination Report for DE 10 2012 107 546.8, filed Aug. 17, 2012.
English translation of Written Opinion dated Feb. 17, 2015 for PCT/EP2013/066892 filed Aug. 13, 2013.
English translation of International Preliminary Report dated Feb. 17, 2015 for PCT/EP2013/066892 filed Aug. 13, 2013.

* cited by examiner

TOOL ARRANGEMENT

FIELD OF THE INVENTION

The invention concerns a tool arrangement.

BACKGROUND OF THE INVENTION

From U.S. Pat. No. 2,328,602, a generic tool arrangement is known, which consists of a screw-in tool and a tool receiver, designed as a machine spindle. An outer thread, which is designed as a buttress thread and engages in a corresponding inner thread on the tool receiver, is located on the screw-in tool. In addition, a conical support surface for the centric placement of a corresponding counter surface on the screw-in tool is provided on the front side of the tool receiver.

In connecting screw-in tools with a tool receiver by means of a thread, the problem may arise that as a result of an elastic deformation of the thread flanks during screwing and tightening, only a few thread courses in the vicinity of the arranged clamping surfaces take over a load-bearing function. Thus, the possible tensile strength of the thread cannot be utilized and the connection does not attain the maximum stability. This is particularly the case if outer and/or inner threads are made of brittle material, such as a hard metal or ceramics.

SUMMARY OF THE INVENTION

One embodiment of the invention relates to a tool arrangement with a tool receiver and a screw-in tool, which makes possible a stable and exact arrangement of the screw-in tool in the tool receiver.

Appropriate refinements and advantageous embodiments of the invention are also disclosed.

In the tool arrangement in accordance with the invention, the threads and the thereby corresponding counter threads have different thread contours, which, in the screwed state, adapt to one another by means of elastic deformation. The advantage is that during screwing, a prestressing over a part of the thread produced due to an elastic deformation of the threads is attained and during clamping, a uniform wear pattern of the thread over its entire length. In this way, the tensile strength of the entire thread is utilized. The thread contour is not understood to mean a thread flank, but rather the contour of the entire thread in the longitudinal section.

In a first advantageous embodiment, the threads and the counter threads have a different pitch. The thread connection can thereby be selected in such a way that the thread component designed as an outer thread has a smaller pitch than the thereby corresponding inner thread. This makes it possible for the thread flanks to be expanded or compressed elastically through the screwing in such a way that the thread contours are adapted to one another. Thus, the entire thread courses are adjacent to one another and a uniform wear pattern can be attained.

In a second advantageous embodiment, threads and counter threads can be designed as conical inner threads and outer threads with different taper angles. In this way, it is also possible to attain an expansion or compression of certain thread areas and thus a uniform wear pattern of the thread connection. In a particularly preferred embodiment, the taper angle of the inner thread is larger than the taper angle of the outer thread. By means of this special development, the thread course of the outer thread has a larger diameter than the corresponding course of the inner thread. By means of the preferably inclined thread flanks, therefore, this part of the outer thread first comes into contact with the inner thread and is thus also first clamped. With a tensing of the thread, this area is elastically deformed and the thread contours adapt to one another. In this way, it is possible to attain a uniform wear pattern.

The outer thread and the corresponding inner thread appropriately have a declining thread depth toward the free end of the threaded plug or toward the inner end of the inner thread. The threads, however, can also have a constant thread depth.

In another advantageous development, the tool receiver contains an insert sleeve in which the inner thread is provided. By selecting a suitable material for the insert sleeve, it is possible to attain vibration damping. Furthermore, the tool receiver can also be made of a solid but brittle hard metal and the insert sleeve with the thread, of a softer, but elastic steel, which is favorable for a secure locking of the screw connection. Moreover, the tool receiver can be adapted by various insert sleeves for the reception of different configurations of screw-in tools. The insert sleeves can consist of one part or several parts, which can also be made of different materials. It is clear that the inner thread can also be placed on the tool in the shape of an insert sleeve.

In an advantageous embodiment, clamping surfaces can be formed by two conical contact or support surfaces with different taper angles on the screw-in tool and the tool receiver. In this way, a support area with a double cone is created, which makes possible an increased support surface and an improved centering and supporting effect, as opposed to a planar contact or a straight contact surface. However, it is also possible to provide planar support surfaces, or when using a conical thread, not to provide a support surface.

The first conical contact surface of the screw-in tool adjacent to a tool head on the tool and the corresponding first conical support surface on the front side of the tool receiver preferably have a relatively large taper angle. Here, a taper angle of 170° has proved to be favorable. In a preferred development, the second conical contact surface follows this surface on the screw-in tool, and the corresponding second conical support surface follows the tool receiver. This second contact surface and the thereby corresponding second support surface preferably have relatively small taper angles. Here, a taper angle of 10° has proved to be favorable. However, it is also possible to provide, for example, a cylindrical intermediate area between the two conical surfaces. A double cone of the described type with two different taper angles has the advantage that the small taper angle makes possible a good centering of the screw-in tool in the tool receiver, and the large taper angle, an additional centering, however, with greatly reduced expansion forces on the tool receiver. Furthermore, due to the first conical contact surface, the rigidity of the tool is increased, since the tool cannot slide off with a radial load, as is the case with a planar contact surface.

Two embodiments are thereby possible for the orientation of the first conical contact surface and the corresponding first conical support surface. In a first preferred development, the diameters of these conical surfaces are reduced in the screw-in direction of the tool—that is, the cones that are based on the cone surfaces forming the double cone point in the same direction. In this embodiment, a slight widening of the tool receiver by the conical surfaces is possible. In comparison to a planar axial contact surface, the thread prestressing rises less sharply with the screw-in angle and it is thus possible to have a more exact adjustment of the prestressing during the assembly of the screw-in tool. Since the screw-in tools are mostly made as one piece from very hard materials, the elastic deformation of the thread needed for the locking of the thread is limited, to a great extent, to the deformation of the inner thread of the tool receiver. With regard to as long as possible a service life of such a tool receiver, an exact adjustment of the thread prestressing is thus extremely important. By means of a double cone of the described type, an exact thread prestressing is made possible because of the better adjusting capacity. In another possible development, the diameters of the first conical contact surface and the corresponding first conical support surface increase in the screw-in direction of the tool—that is, the cones that are based on the two conical surfaces forming the double cone point in the opposite directions. With such a development of the double cone, a widening of the tool receiver is counteracted, since the radial forces caused by the conical surfaces are opposed. The special advantage of this development is that a higher tightening torque can be attained by the reduced widening of the sleeve with the inner thread, without thereby damaging the thread sleeve.

In another advantageous manner, another support area with another contact surface and a thereby corresponding additional support surface are provided on the free end of the threaded plug and, correspondingly also, on the inner end of the inner thread. This additional contact surface on the threaded plug can have, for example, a spherical shape, whereas the corresponding additional support surface can be made cylindrical. As a result of the spherical contact surface and the cylindrical support surface, an only partial contact between the screw-in tool and the tool receiver is attained in this area. Appropriately, the spherical contact surface has an excess dimension in comparison to the cylindrical support surface, so that the prestressing in this additional support area is independent of the screw-in depth. However, other developments of the additional support area are conceivable. Thus, in an arbitrary combination, spherical, conical, or cylindrical contact surfaces or support surfaces can also be provided on the tool and the tool receiver.

The thread can be designed as an outer or inner thread, wherein, then, the counter thread is accordingly designed as a corresponding inner or outer thread.

The tool receiver can, for example, be made of steel, carbide, aluminum, or a fiber composite, in particular with glass or carbon fibers.

BRIEF DESCRIPTION OF THE DRAWINGS

Other features and advantages of the invention can be deduced from the following description of preferred embodiment examples with the aid of the drawings. The figures show the following.

DETAILED DESCRIPTION OF THE INVENTION

Figure 1:
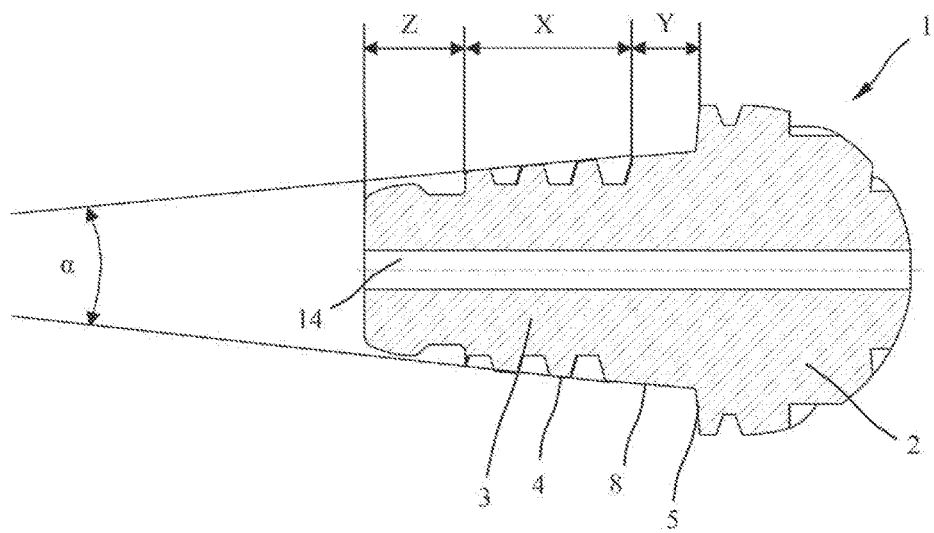
FIG. 1, a screw-in tool in a longitudinal section.

FIG. 1 shows a screw-in tool 1 of the tool arrangement in a sectional view. The screw-in tool 1 has a tool head 2, which is designed as a spherical-head milling cutter, and a tool shaft 3, which tapers conically toward the rear. The tool shaft 3 is subdivided in the embodiment example shown here into a thread area X with an outer thread 4, a first outer support area Y located between the tool head 2 and the outer thread 4, and a second inner support area Z on the free end of the tool shaft 3. The tool shaft 3, however, can also be made without an additional outer support area Y and/or without an inner support area Z.

The outer thread 4 in the thread area X tapers conically with the taper angle $\alpha$. The first outer support area Y has a first conical contact surface 5 for the placement on a counter-conical support surface 6 on a front side of a tool receiver 7 and a second conical contact surface 8 for the placement on a second conical support surface 9 in the interior of the tool receiver 7. In this way, a double cone, which provides an improved centering and an increased support effect, is produced on the transition between the tool head 2 and the outer thread 4.

Figure 2:
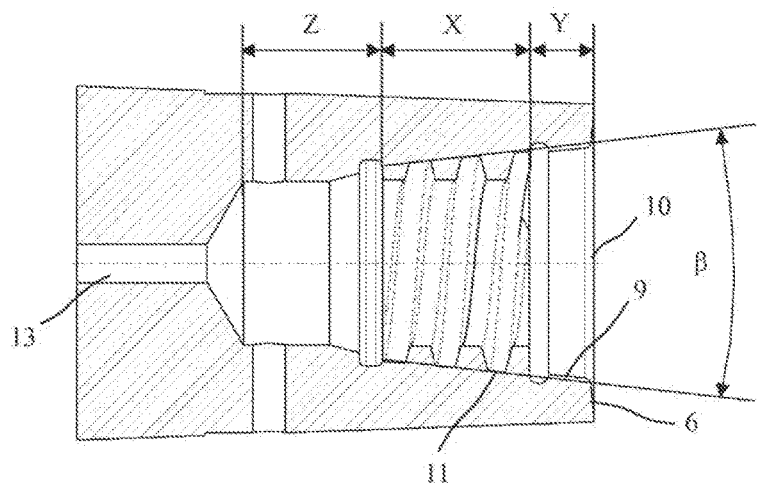
FIG. 2, the tool receiver in a longitudinal section.

FIG. 2 shows the tool receiver 7 that belongs to the screw-in tool 1. This has a receiver opening 10 with an inner thread 11. The inner thread 11 is conically designed and corresponds to the outer thread 4 of the screw-in tool 1, but has taper angle $\beta$ larger than the taper angle $\alpha$. The pitches of the outer thread 4 and the inner thread 11 can be made equivalent. On the front side of the tool receiver 7, the outer support area Y is provided with the first support surface 6 for the placement on the first contact surface 5 and with the second conical support surface 9 for the placement on the second contact surface 8 of the screw-in tool 1. Also, in the tool receiver 7, a supply opening 13 is arranged coaxial to its middle axis 12 for the supply of the work fluid to the passage opening 14 of the screw-in tool 1.

If the screw-in tool 1 is inserted into the receiver opening 10 of the tool receiver 7, the thread courses of the outer thread 4 close to the free end of the tool shaft first engage with the inner thread 11. Upon screwing, this part of the thread connection is also first compressed or expanded, so that in this area, the thread flanks of the thread connection lie next to one another. During the tightening of the thread connection, the other thread courses of the thread connection also engage and a uniform wear pattern is produced. Stresses that are applied via the tool head on this thread connection are uniformly distributed on the various thread flanks and introduced into the tool receiver. The thread connection of this tool arrangement is thus extremely stable and effective. For this thread connection, threads with inclined surfaces—that is, conical threads, round threads, buttress threads, or the like—are particularly suitable.

Figure 3:
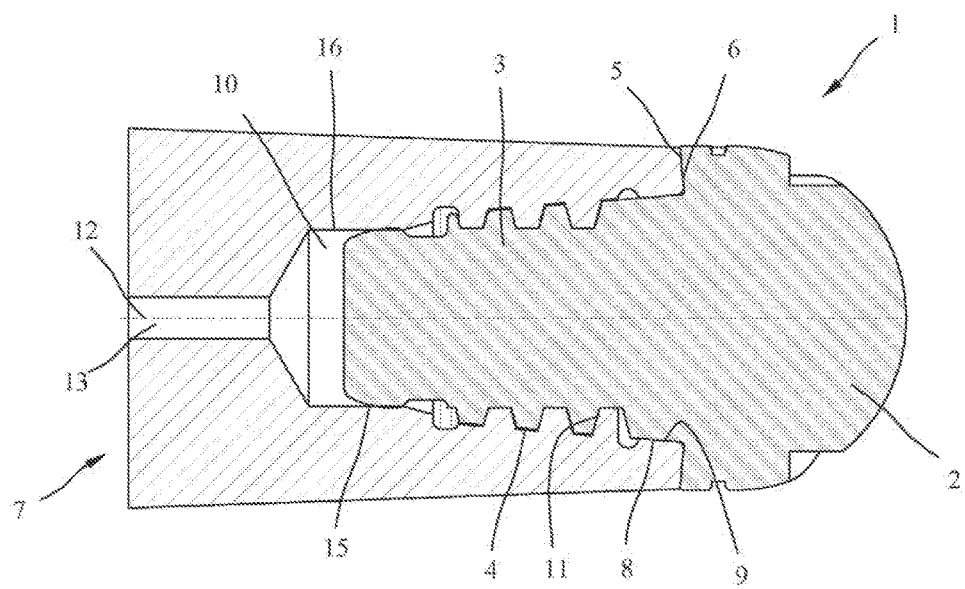
FIG. 3, the tool arrangement in a longitudinal section.

The advantages described, however, can also be attained with another embodiment, which is shown in FIG. 3. In this other embodiment, the different thread contours of the outer thread 4 and the inner thread 11 are attained by the different thread pitches. With such a thread connection, there is a compression or expansion of the thread flanks during the screwing. The magnitude of the compression or expansion can be adjusted via the difference of the thread pitches. Thus, it is possible to produce, in a purposeful manner, a specific prestressing within the thread connection so as to attain a uniform wear pattern of the thread flanks. The outer thread 4 in FIG. 3 has a smaller thread pitch than the inner thread 11. This makes it possible for the outer thread 4 to be stretched during the screwing with the inner thread 11, and for the inner thread 11 to be compressed. If this thread connection is tightened, then all thread courses lie next to one another by means of the compression or expansion during the screwing, and a uniform wear pattern and a very stable connection are produced. For the outer thread and the corresponding inner thread, both conical and cylindrical thread forms, which are designed as trapezoidal threads, flat threads, conical threads, round threads, buttress threads, or the like, can be used.

In the embodiment of the tool arrangement shown in FIG. 3, the outer thread 4 of the screw-in tool 1 and the inner thread 11 of the tool receiver 7 that belongs to it are made as trapezoidal threads with a flank angle of 30°. The outer thread 4 of the screw-in tool 1 and the inner thread 11 of the tool receiver 7 that belongs to it, however, can also be made as trapezoidal threads with other flank angles. In contrast to the traditional threads in which the thread courses have a constant thread depth, the outer thread 4 used here has a thread depth that declines from the tool head 2 to the free rear end of the tool shaft 3. Also with the inner thread 11 of the tool receiver 7, the thread depth declines from the second support surface 9 to the second support area Z. In this way, the different stresses over the length of the thread are taken into consideration.

From FIG. 3, one can see that the first contact surface 5 of the screw-in tool 1 and the corresponding first support surface 6 of the tool receiver 7 are inclined by 5° with respect to a plane that is perpendicular to the middle axis 12, in the direction of the front end of the tool head 2. In this way, the first conical contact surface 5 and also the first conical support surface 6 have a taper angle of at least 140° and a maximum of 179°, but preferably 170°. The diameter of the second conical contact surface 8 of the screw-in tool 1 and the diameter of the second conical support surface 9 of the tool receiver 7 taper in the screw-in direction, so that a taper angle of at least 1° and less than 90° is produced, but preferably 10°, which means an angle of the conical surfaces of 5° relative to the middle axis 12.

The figures, moreover, show the second support area Z. This is formed by another spherical contact surface 15 of the screw-in tool 1 and a thereby corresponding cylindrical support surface 16 at the end of the receiver opening 10. The spherical contact surface 15 provides for an only partial contact between the screw-in tool 1 and the tool receiver 7. Appropriately, the spherical contact surface 15 has an excess dimension in comparison to the cylindrical support surface 16, so that the prestressing in this support area Z is independent of the screw-in depth. The second support area increases the stability and the concentric accuracy of the tool arrangement through the other support point.

In the embodiment example shown in FIG. 3, the diameters of the first conical contact surface 5 of the screw-in tool 1 and the corresponding first conical support surface 6 of the tool receiver 7 are expanded in the screw-in direction of the screw-in tool 1. The first contact surface 5 and the corresponding first support surface 6 are inclined 5° relative to a plane perpendicular to the middle axis 12, in the direction of the tool shaft 3. In this way, the first conical contact surface 5 and also the first conical support surface 6 have a taper angle of 170°, just as in the embodiment example of FIGS. 1 and 2. The second contact surface 8 and the second conical contact surface 9 taper with an angle of 5° relative to the middle axis 12, so that a taper angle of 10° is produced. In contrast to the embodiments of FIGS. 1 and 2, the cones that are based on the two conical surfaces forming the double cone point in opposite directions.

The invention is not limited to the embodiment examples described in the preceding and shown in the drawing. Thus, for example, a different thread contour between the outer and the inner threads can also be attained in a manner other than the one described. In addition, instead of the centering of the screw-in tool via the double-conical centering surfaces, a planar contact surface can also be used. In the embodiment with the conical thread connection, one can also dispense entirely with an additional contact surface. Thus, it is also possible, however, to combine features of the described embodiment examples with one another. Therefore, it may be advantageous, for example, to design a conical thread connection with different taper angles and different pitches, so as to attain a particularly high prestressing or tightening in the thread connection.

The invention claimed is:

1. A tool arrangement comprising:
a milling cutter having a thread disposed therein; and
a milling cutter receiver having a counter thread disposed therein;
wherein the thread and the counter thread have different thread contours, one of the thread and the counter thread being more brittle than the other, and where a thread contour includes an entire length of the thread or counter thread in a longitudinal section; and
whereupon engagement of the milling cutter with the milling cutter receiver, the less brittle of the thread and the counter thread elastically expands or compresses relative to the other such that the thread contour of the thread and the thread contour of the counter thread adapt to each other,
wherein the milling cutter and the milling cutter receiver further comprise at least one support area formed by two conical contact surfaces or conical support surfaces having different taper angles; and
wherein the two conical contact surfaces or conical support surfaces are directly adjacent to one another.

2. The tool arrangement according to claim 1, wherein the thread and the counter thread have different pitches.

3. The tool arrangement according to claim 1, wherein the thread and the counter thread are a conical inner thread and a conical outer thread having different taper angles.

4. The tool arrangement according to claim 3, wherein the taper angle of the conical inner thread is larger than the taper angle of the conical outer thread.

5. The tool arrangement according to claim 1, wherein at least one of the thread or the counter thread is disposed on a threaded plug.

6. The tool arrangement according to claim 5, wherein at least one of the thread and the counter thread has a thread depth that declines to an end of the threaded plug.

7. The tool arrangement according to claim 1, wherein the milling cutter receiver or the milling cutter further comprises a sleeve in which the thread is disposed.

8. The tool arrangement according to claim 1, wherein the support area is formed by a first conical contact surface or conical support surface adjacent to a tool head of the milling cutter, and a second conical contact surface or conical support surface.

9. The tool arrangement according to claim 8, wherein the first conical contact surface or conical support surface has a taper angle of 170°, and the second conical contact surface or conical support surface has a taper angle of 10°.

10. The tool arrangement according to claim 1, wherein a diameter of a first conical contact surface or conical support surface is increased or decreased in a screw-in direction of the screw-in tool.

11. The tool arrangement according to claim 1, further comprising a second support area formed by a contact surface of the milling cutter and a corresponding support surface of the milling cutter receiver.

12. The tool arrangement according to claim 11, wherein the contact surface has an excess dimension in comparison to the corresponding support surface such that a pressing between the contact surface and the support surface occurs during assembly of the milling cutter and the milling cutter receiver.

13. The tool arrangement according to claim 11, wherein the support surface and the contact surface are shaped as cylindrical, spherical, or conical support or contact surfaces.

14. The tool arrangement according to claim 1, wherein the thread is an inner or outer thread and, correspondingly, the counter thread is an outer or inner thread.

15. A milling cutter for a tool arrangement according to claim 1.

16. A milling cutter receiver for a tool arrangement according to claim 1.

* * * * *